United States Patent [19]

Forshee

[11] 4,403,697
[45] Sep. 13, 1983

[54] RACK CONSTRUCTION

[76] Inventor: David J. Forshee, 11 Misty Morning Dr., Hilton Head Island, S.C. 29928

[21] Appl. No.: 220,828

[22] Filed: Dec. 29, 1980

[51] Int. Cl.³ .............................................. F16M 11/00
[52] U.S. Cl. ..................................... 211/13; 108/55.3; 206/319; 206/600; 410/49
[58] Field of Search ................ 211/13; 108/55.3, 56.1; 410/49; 206/319, 600

[56] References Cited

U.S. PATENT DOCUMENTS 3,291,073 12/1966 James ..................................... 410/49
3,315,800 4/1967 Wagner .......................... 108/55.3 X
4,305,508 12/1981 Rodgers ........................... 206/319 X

FOREIGN PATENT DOCUMENTS 2452493 5/1976 Fed. Rep. of Germany ...... 206/319
1418284 10/1965 France ................................. 206/600

Primary Examiner—William E. Lyddane
Assistant Examiner—Robert W. Gibson, Jr.
Attorney, Agent, or Firm—Benjamin W. Colman

[57] ABSTRACT

A supporting rack comprises a plurality of cradle sets arranged in a series upon a lift platform, to translate a plurality of substantially identical load units or subassemblies, one to each cradle set, from one station or location to another. The cradle set comprises a pair of parallel, opposed, spaced apart nest members having elements projecting laterally therefrom in opposing relationship to support a load unit or subassembly therebetween, and a pair of lateral separator and tieing members removably secured to the ends of the nest members whereby to maintain the latter in upright, spaced apart relationship for facile reception of the said load unit or subassembly by and discharge from the nest members. The cradle sets can be arranged in parallel, adjacent, side-by-side series, in which case one of the lateral separator and tieing members is designed to separate and connect the nest members of parallel, adjacent, side-by-side cradle sets.

31 Claims, 23 Drawing Figures

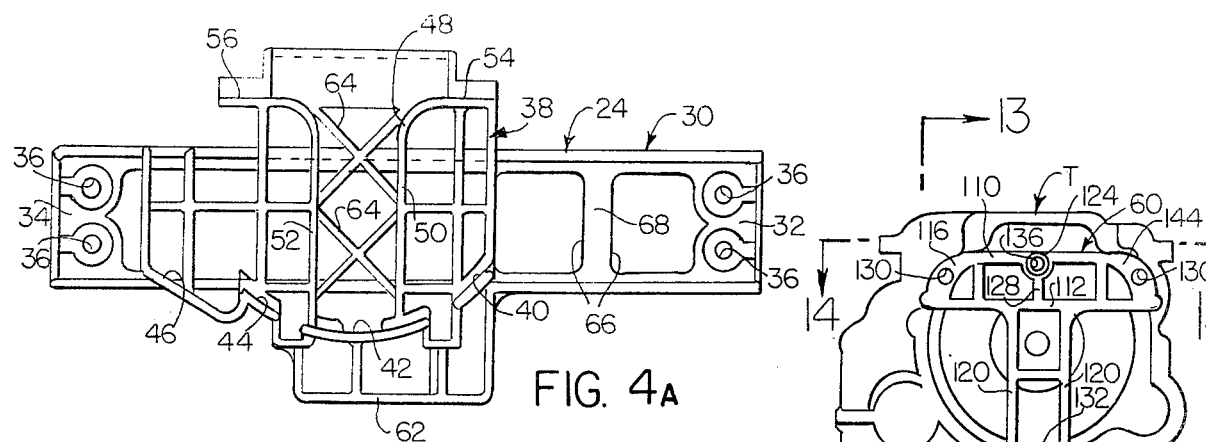
FIG. 4A
FIG. 4B
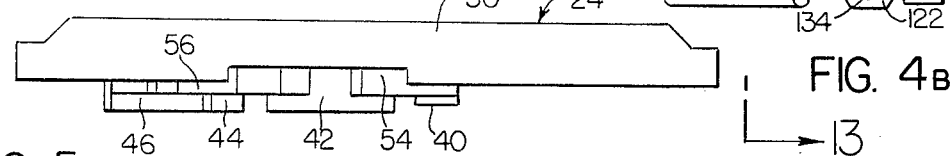
FIG. 5
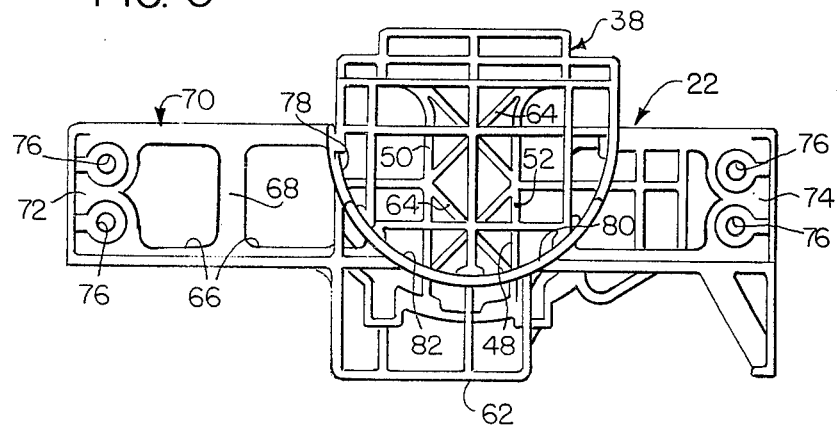
FIG. 6
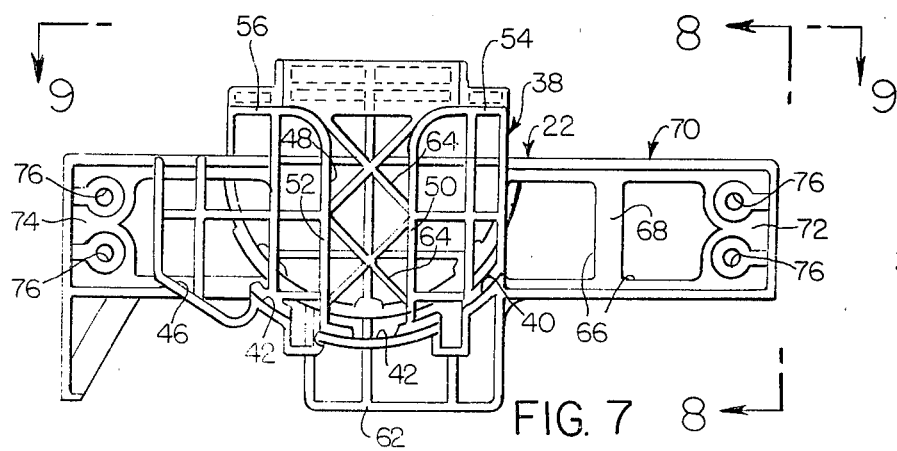
FIG. 7
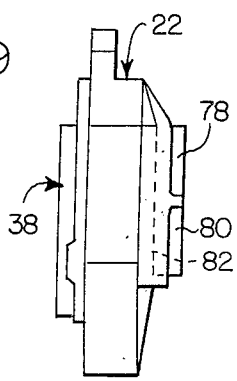
FIG. 8
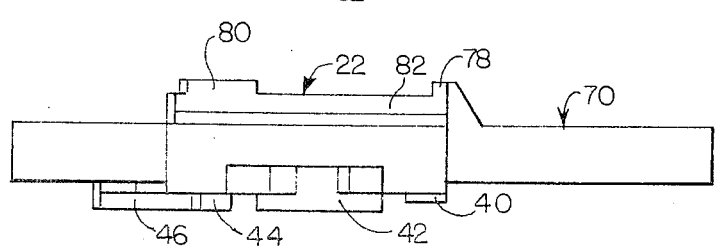
FIG. 9

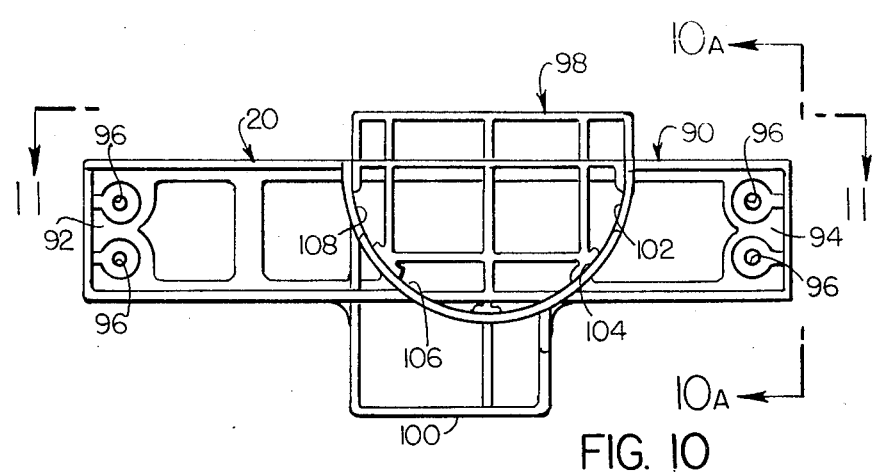
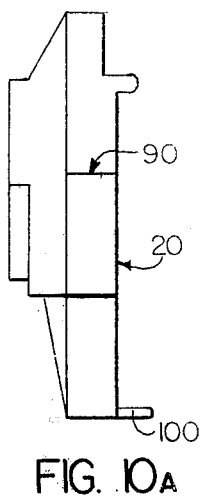
FIG. 10    FIG. 10A
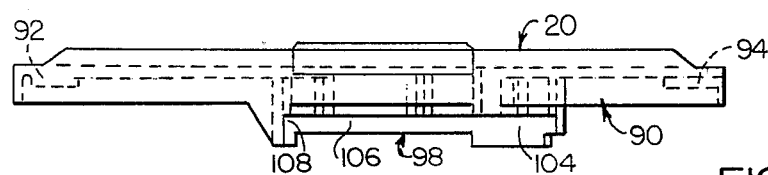
FIG. 11
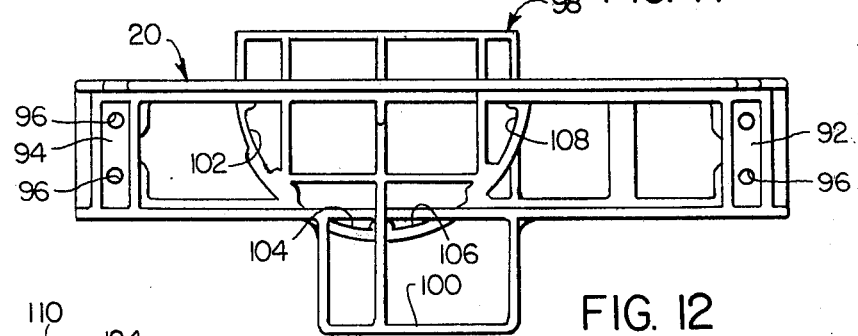
FIG. 12
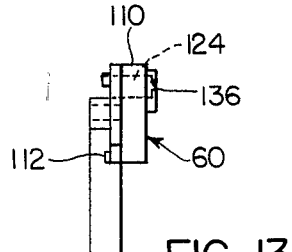
FIG. 13
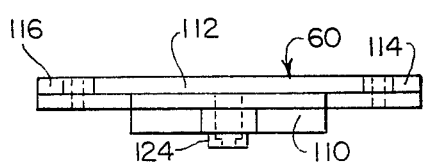
FIG. 14
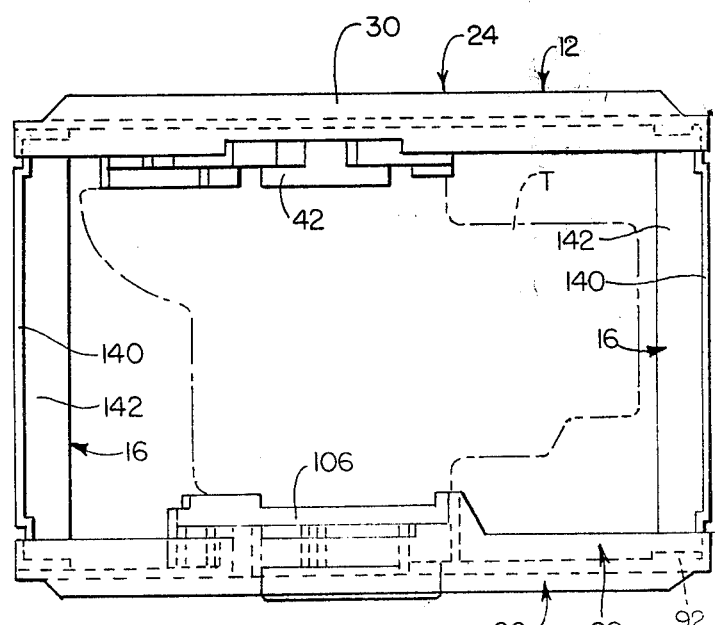
FIG. 21

RACK CONSTRUCTION

BACKGROUND OF THE INVENTION

The invention relates to an assembly of separable plastic components and members forming a supporting rack for a plurality of substantially identical metallic load units or subassemblies which require a protective translation device for cradling these units or subassemblies in their movement from one station or location to another, by means of a lift truck, motorized common carrier, and/or railroad car.

In the past, one type of transfer rack has been made of metal. Although the racks have been adequately supportive, they have not been as protective of their loads as is required. In some instances, elements of the load units or subassemblies have become displaced in relationship to their housings so that damage to the elements and the units has occurred. Exterior surfaces of the load units have been damaged by metal-to-metal contact with the supportive racks. Forming these racks out of steel has increased substantially the load weight which must be carried by trucks and railroad cars. Such added weight has of course been a severe burden not only in costs but also upon the energy requirements of the hauling power units, e.g., lift trucks and truck engines, and upon the locomotives pulling railroad cars containing these loads.

Another type of transfer rack which has met with limited use has been a vacuum-formed sheet of plastic material having cavities or recesses molded in the shape of the lower configuration of the load unit or subassembly to be carried by the rack. The problem arising in the use of this type of transfer rack has been the relative insecurity of load units or subassemblies seated in the cavities of a relatively thin fragile plastic sheet. The units have popped out of their recesses and been damaged by contact with other units on the rack, or on floor planes when they fell out of the rack entirely.

Losses in damaged load units or subassemblies and from high weight load transportation charges have been a significant factor in material handling costs. The instant invention was designed to provide one solution to this problem.

SUMMARY OF THE INVENTION

The invention generally comprises a pair of plastic load-carrying components so arranged that, except for the end load carrying components of a rack series, the intermediate components are each partially supportive and protective of two adjacent load units or subassemblies carried by the transfer rack. The load unit or subassembly is located and supported between two of these plastic components which are secured by lateral separator members in spaced apart substantially parallel relationship upon a liftable platform.

The rack components and separator members are arranged in a series of cradles designed to support a plurality of the load units or subassemblies. In the drawings forming an integral part of this specification, a rack for ten load units or subassemblies translatable upon a lift platform is illustrated and will be more specifically described hereinafter-below.

When the plastic load-supporting components are arranged in rack cradle formation upon the lift platform, the load units or subassemblies are simply lowered into the cradle compartments. When the rack is completely filled with these load units, a lift truck carries the loaded platform to a storage area where it is set at rest, or into a waiting truck, railroad car, boat or other type of vehicle for translation to an assembly location or other station.

There are several advantages to the plastic rack construction embodying the invention disclosed herein. Although hold-down straps are required for load units carried by steel racks now in use, such straps are not required for the rack construction of this invention. The weight of the plastic rack is much lighter than that of a steel rack for the same number of load units carried thereby. The damage ensuing to load units carried by plastic racks is very much less than the damage resulting in the use of a steel rack, appreciably reducing the cost of maintaining the load units. The plastic rack provides much better and greater protection for the load units or subassemblies carried thereby. The unit cost of the plastic racks disclosed herein is lower than that for comparable steel racks. Because the plastic component members are each integrally molded and designed for bolt assembly, the replacement cost of each member is appreciably less than is required to maintain and reconstruct steel racks by cutting, welding and reassembly. Because the plastic component members are color impregnated, according to customer or governmental requirements, no painting or repainting is necessary. Since plastic materials will not rust, there is no appreciable deterioration of the rack or cradle set, such as occurs in steel rack construction.

BRIEF DESCRIPTION OF THE DRAWINGS

FIGS. 3 and 4a are side elevational views taken substantially on the lines 3—3 and 4a—4a of FIG. 2, showing both sides of a first end rack component.

FIG. 4b is a side elevational view of a strap component which functions in complement with the first end rack component and the intermediate rack component illustrated in FIGS. 4a and 6, respectively.

FIG. 5 is a top plan view taken substantially on the line 5—5 of FIG. 3, of the rack component illustrated in FIGS. 3 and 4a.

FIGS. 6 and 7 are side elevational views taken substantially on the lines 6—6 and 7—7 of FIG. 2, showing both sides of an intermediate rack component.

FIG. 8 is an end elevational view taken substantially on the line 8—8 of FIG. 7.

FIG. 9 is a top plan view taken substantially on the line 9—9 of FIG. 7, of the center or intermediate rack component illustrated in FIGS. 6 and 7.

FIGS. 10 and 12 are side elevational views taken substantially on the lines 10—10 and 12—12 respectively of FIG. 2, showing both sides of a second end rack component.

FIG. 10a is a side elevational view taken substantially on the line 10a—10a of FIG. 10.

FIG. 11 is a top plan view taken substantially on the line 11—11 of FIG. 10, of the second end rack component illustrated in FIGS. 10 and 12.

FIGS. 13 and 14 are side elevational and top plan views respectively taken substantially on the lines 13—13 and 14—14 of FIG. 4b, illustrating further the construction of the strap component.

FIG. 21 is a top plan view of a single cradle set construction embodying the invention.

DETAILED DESCRIPTION OF THE PREFERRED EMBODIMENT

As shown in the several views of the drawings, the rack 10, a preferred embodiment of the invention, comprises a plurality of nests or cradles 12 formed of four component unitary elements removably connected together and arranged in a series for cradling a plurality of load units or subassemblies upon a platform 14.

Figure 1:
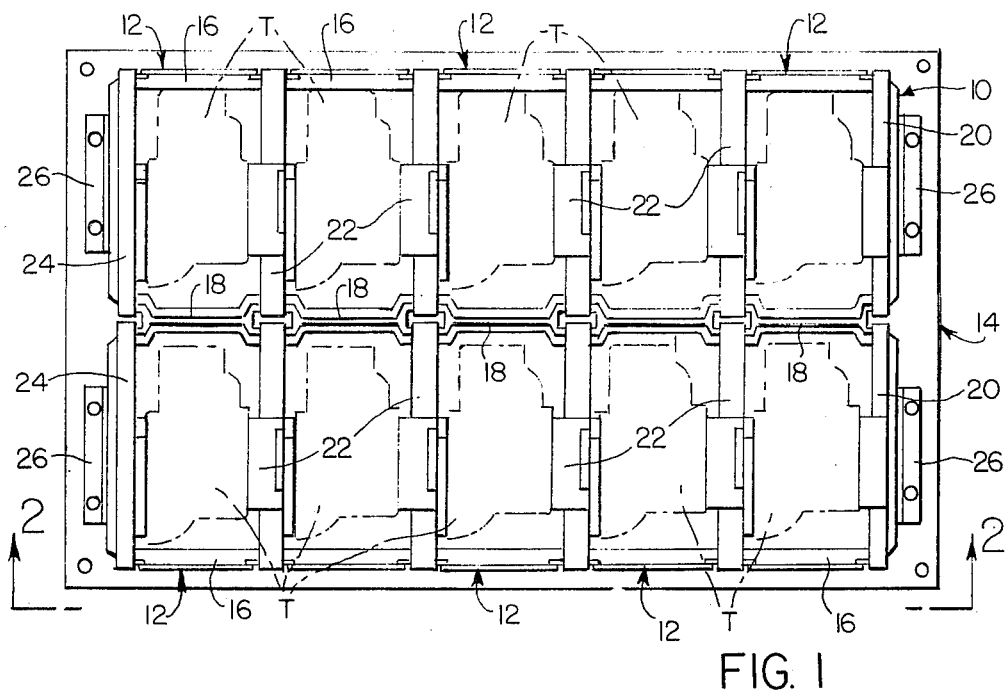
FIG. 1 is a top plan view of a preferred embodiment of the invention showing load units or subassemblies, in phantom lines, carried by the rack of this invention.

The unitary elements of a single cradle 12 comprise a side or outer separator member 16, an intermediate or center separator member 18, a first end nest component 20, and a center or intermediate nest member 22; at the end of the series opposite from the first end nest member 20, the second end nest member 24 completes the rack series on the platform. Of course, if a single series of cradles is arranged, instead of the dual series as shown in FIG. 1, the center separator 18 is replaced by another outer separator 16.

The rack 10 is designed to cradle a plurality of specific units or subassemblies. In the example disclosed, illustrated and described herein, the subject load unit or subassembly is the transaxle T forming a component element of a motor vehicle. It is to be understood by persons skilled in the art to which the invention pertains that the end nest members and the center nest members will vary in part for accommodation of and adaptation to the outer end configurations of the units or subassemblies required to be translated from one station to another. Although specifically described herein for a transaxle outer end configuration, it is to be understood that the rack cradle set 12 varies only in respect to the particular nest portions seating and supporting the load units therebetween, and the distances between the end and central nest members, or two adjacent center nest members, as the case may be.

The rack components and separator members are made of a super tough plastic nylon resin material, a thermoplastic polyamide, which may be reinforced with glass fibers to increase their strength, stiffness and dimensional stability. This material is known as Zytel ST, manufactured by the E. I. Du Pont De Nemours Co., Inc. of Wilmington, Del. The resin material is produced in granules which are moldable into the rack components and members described herein. The plastic resin rack components eliminate the metal-to-metal contact and resultant damage heretofore occuring in the steel racks used to support and cradle these heavy metallic load units and subassemblies.

The load units carried by these racks vary in dimensions and configuration, and the end nest and center components 20, 24 and 22 are designed to complement and cradle the ends of the particular load units or subassemblies to be carried by the racks. The end nest members 20 and 24 complement and cradle opposite ends of the load units, while the intermediate or center nest components 22 are molded to seat both ends of the units, i.e., one side A of component 22 supports one end of a load unit T and the opposite side B supports the opposite end of an adjacent load unit T. As shown particularly in FIGS. 6 and 7, the center nest components 22 are double-faced, designed on one side to cradle and support one end of a load unit and on its opposite side the other end of an adjacent load unit.

A complete rack or series 10 is designed to support and cradle a plurality of substantially identical load units or subassemblies. In some instances, the cradles 12 are arranged in a single row upon the platform 14, or as illustrated in FIG. 1, the racks are arranged in double adjacent parallel rows connected together by the intermediate side members 18. When arranged in a series, the cradles may be disposed between stop devices 26 such as metal angle members secured to the platform plate 28, to limit longitudinal displacement of the cradles 12 during translation of the platform from one station to another. Similar lateral stop members (not shown) can be used to limit and prevent lateral displacement of the cradles during translation.

Figure 2:
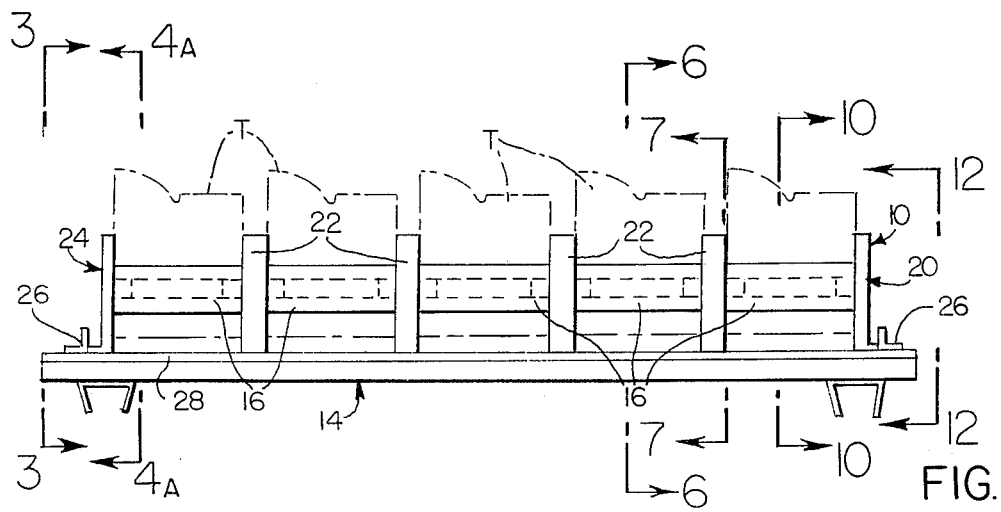
FIG. 2 is a side elevational view taken substantially on the line 2—2 of FIG. 1.
Figure 3:
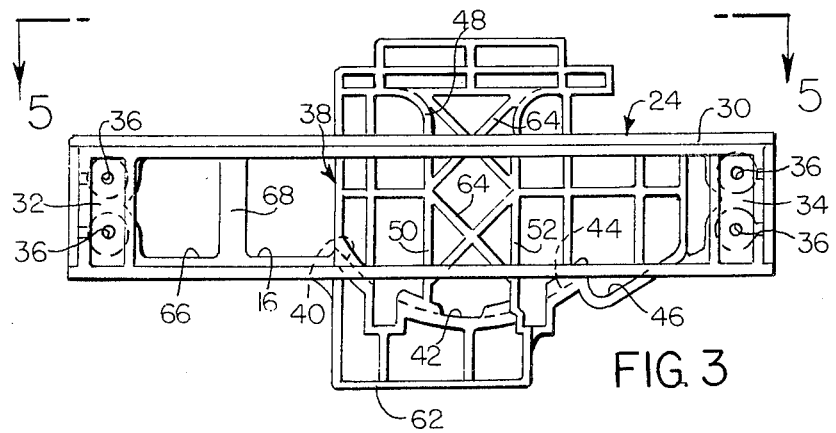
Figure 15:
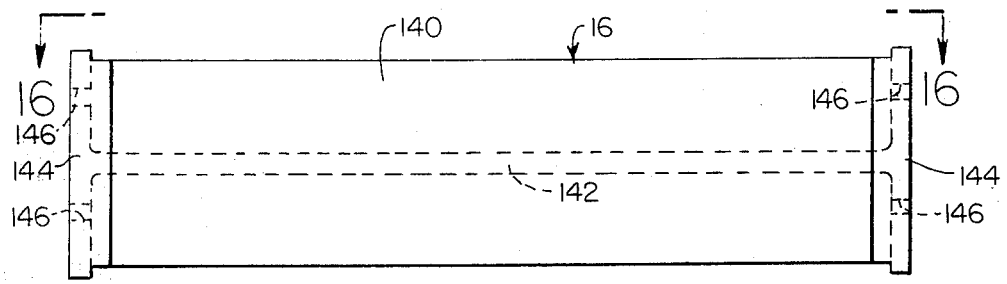
FIGS. 15, 16 and 17 are side elevational, top plan and end elevational views respectively of a side or outer separator rack member, FIGS. 16 and 17 being taken substantially on the lines 16—16 and 17—17 of FIGS. 15 and 16 respectively.
Figure 16:
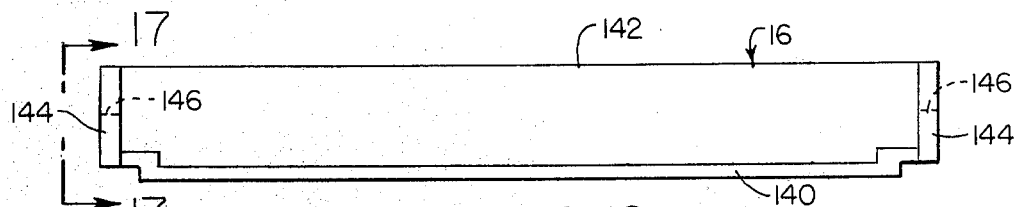
Figure 17:
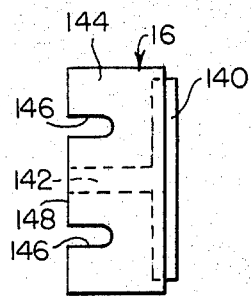
Figure 18:
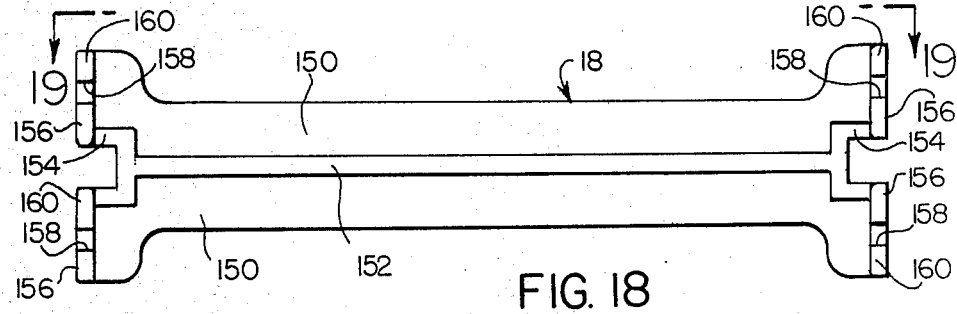
FIGS. 18, 19 and 20 are top plan, side elevational and end elevational views respectively of an intermediate or center separator rack member, FIGS. 19 and 20 being taken substantially on the lines 19—19 and 20—20 of FIGS. 18 and 19 respectively.
Figure 19:
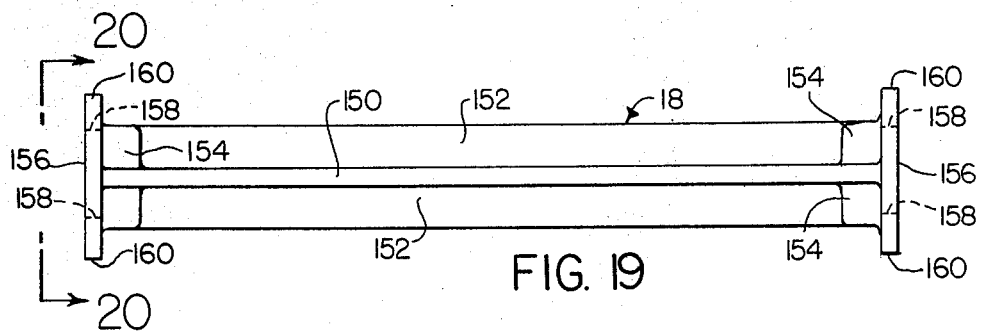
Figure 20:
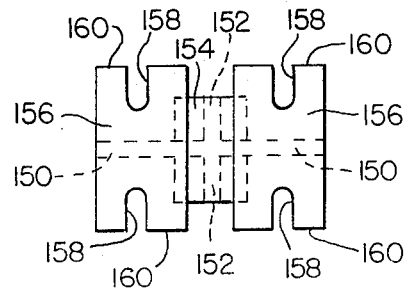

As shown particularly in FIGS. 3, 4a and 5 of the drawings, the end nest member 24 (at the left of the series in FIGS. 1 and 2), molded as a unitary plastic cradle component of a super-tough nylon resin material, comprises a substantially rectangular frame 30 having solid connector end panel members 32, 34 provided with bolt openings 36 therethrough. On the opposite side of the frame and molded integrally with it is a grid 38 having laterally directed support ledges 40, 42, 44 and 46, a medial channel 48 defined by a pair of spaced apart vertical guide ribs 50, 52 each extending upwardly from the ledge 42 and curving into horizontally extending lateral support ledges 54, 56 respectively upon which a load unit by its attached strap 60 can be supported. The grid 38 is provided with a plurality of openings defined by horizontal and vertical rib members which impart considerable strength and rigidity to the component. The base 62 of the grid rests upon the surface of the rack lift platform 14. The grid 38 is further provided with cross members 64, 64 to strengthen and maintain the dimensional stability of the guide ribs 50, 52. In addition, to further reduce the weight of the rack, there are several openings 66 defined by vertical ribs 68 which strengthen the frame 30.

The center or intermediate nest member 22 (FIGS. 6, 7, 8 and 9), also molded as a unitary plastic cradle component of a super-tough nylon resin material, comprises the rectangular frame 70 having solid connector end panels 72, 74 with bolt holes 76 therethrough. A grid 38 having the lower laterally directed load unit support ledges 40, 42, 44 and 46, the medial channel 48 defined by the vertical ribs 50, 52, and 54, 56, as in the member 24, is integrally molded with the frame 70, on one side A thereof (FIG. 7). The base 62 of the grid 38 rests upon the surface of the rack lift platform 14.

Additionally, the member 22 comprises and includes, on its opposite side B (FIG. 6), an integrally molded and formed support for the opposite end of the load unit T, in this particular case the pump body end. The grid 38 extends through the frame 70 from the A-side to the B-side of the member. Integrally molded with the grid 38 on side B are the laterally extending support ledges 78, 80 and 82 for the pump body end of the load unit T. As in the member 24, the frame 70 is also provided with the vertical rib 68 and openings 66, 66 adjacent thereto.

As shown particularly in FIGS. 10, 10a, 11 and 12, the end nest member 20 (at the right of the series in FIGS. 1 and 2), molded as a unitary plastic cradle component of the same or similar super-tough nylon resin material, comprises the substantially rectangular frame 90 having solid connector-end panels 92, 94 with bolt openings 96 therethrough, the grid 98 formed integrally with the frame on one side thereof and corresponding substantially identically with the support for the pump body end on side B of member 22, and a base 100 adapted to rest on the surface of the rack lift platform 14. The grid 98 is provided on its inner lateral side with load unit support ledges 102, 104, 106 and 108 which project laterally outwardly from the grid for support of the pump body end of load unit T.

As shown particularly in FIGS. 4b, 13 and 14, the strap component 60 is a unitary plastic generally T-shaped member, molded of the same or similar super-tough nylon resin material as that used for the cradle components 20, 22 and 24, and comprises the horizontal ledges 110, 112, the lateral flanges 114, 116, the vertical T-stem ribs 120, 120, the base element 122, and the upper bolt shroud 124. The upper horizontal ledge 110 is supported by the vertical ribs 126, 126 and the central rib 128 connected to the bolt shroud 124. The lateral flanges 114, 116 are provided with bolt openings 130, 130 therethrough. The base element 122 is provided with the bolt shroud 132 having a bolt opening 134 therethrough at one end. The bolt shroud 124 is also provided with a bolt opening 136 at the corresponding end.

The outer separator member 16 and the intermediate or center separator 18, arranged in parallel relationship, separate and tie the end nest component member 20 to the next adjacent intermediate center nest component member 22 to form a cradle set 12. The outer separator 16 comprises a longitudinally extending body portion 140 having a medial rib 142 connected to the end panels 144, 144 each having bolt slots 146, 146 therethrough adjacent an edge 148 of the end panel. The medial rib 142 extends from the body portion 140 substantially at right angles thereto as a reinforcing and stiffening rib for the body portion and the end panels. The separator is integrally formed and molded of a super-tough nylon resin material, similar to that used for the component members 20, 22 and 24.

The intermediate or center separator member 18 comprises longitudinally extending body portion 150 having medial ribs 152, 152 integrally formed and connected to and extending laterally from the body portion on each side thereof as reinforcing and stiffening ribs for the body portion and for the integrally connected end yokes 154, 154 which are connected to the four end panels 156. The end panels are each provided with two bolt slots 158 therethrough adjacent opposite edges 160, 160 of the end panel.

The function of the strap component 60 is that of an accessory for a load unit such as the transaxle T. These transaxles have a torque convertor subassembly rotatably mounted therein and which is movable axially of its housing. In order to maintain the torque convertor stable and relatively immovable in the housing during translation of the transaxle load unit, it is desirable to secure the torque converter to the housing and this function is performed by the strap component 60. Bolts are passed through the shrouds 124 and 132 to secure the strap to the torque convertor, and then bolts are passed through the openings 130, 130 securing the strap to the housing of the transaxle. By this means, the torque convertor is rendered substantially immovable in its housing during translation of the load unit T in the cradle set 12. The vertical ribs 120, 120 of the strap are designed to pass between the vertical guide ribs 50, 52 of the grid 38 in the component nest members 24 and 22, when the load unit T is being lowered into and removed from the cradle set 12. Of course, if there is no separately movable or rotatable element in the load unit carried by the rack, a component or accessory such as the strap 60 is not required.

The components of the cradle set are secured together in the relationship illustrated in the drawings and described above by means of fasteners such as conventional bolts or screws and nuts. Bolts are passed through the bolt openings 36 of the end nest component end panel 34 to connect it to end panel 144 of the outer separator 16 at bolt slots 146 therein. The other end of the separator 16 is connected by bolts and nuts to the end panel 74 of the adjacent intermediate nest component 22 at its bolt openings 76. On the opposite side of the cradle set, the end nest component end panel 32 is connected to one of the end panels 156 of the center or intermediate separator 18 by passing bolts through the bolt openings 36, 36 of end panel 32 and slots 158, 158 in register therewith of the separator end panel 156. The opposite end of the separator 18 is similarly connected to the adjacent center or intermediate nest member 22 at bolt openings 76 of its end panel 72.

These connections continue from one cradle set to the next until end nest component 20 is reached at the opposite end of the series 10. The member 20 is connected to the outer and center separators 16 and 18 respectively, in a manner similar to that for the component member 24.

It will of course be readily apparent to persons skilled in the art to which the invention pertains that the plastic members 20, 24 and 16 can be arranged to form a single cradle set 12 as well as the series 10 described above and illustrated in FIGS. 1 and 2. Such a single cradle set is illustrated in FIG. 21. The load unit supporting components 20 and 24 are then arranged in parallel, opposing, spaced apart relationship and connected at their respective ends by two outer separator members 16 to form a single cradle set 12 without intermediate members 22.

Having disclosed herein certain particular preferred embodiments of the invention for purposes of explanation, further modifications or variations thereof, after study of this specification, will or may occur or become apparent to persons skilled in the art to which the invention pertains. Reference should be had to the appended claims in determining the scope of the invention.

I claim:

1. A cradle set for translating a load unit or subassembly from one station to another comprising
    a pair of plastic unitary integrally molded grid-type end nest component members, each having laterally extending support ledges complementary to and with a selected end portion or portions of said load unit or subassembly to support and cradle the same, said end nest members being arranged in parallel opposedly facing relationship,
    a pair of plastic unitary integrally molded separator and tieing members removably secured to respective opposedly facing ends of said end nest members,
    a plastic unitary, integrally formed accessory strap component operatively engageable with at least one said end nest component member and said selected end portion or portions securing said load unit or subassembly in said cradle set during translation of said load unit, and fastener means removably securing said separator and tieing members to said end nest members.

2. The cradle set defined in claim 1, wherein
said end nest members and separator and tieing members are made of a super tough plastic nylon resin or equivalent plastic material.

3. The cradle set defined in claim 1, wherein
said end nest members and separator and tieing members are made of a thermoplastic polyamide or equivalent plastic material.

4. The cradle set defined in claim 1, wherein
said end nest members and separator and tieing members form a rectangular cradle set.

5. A cradle set for translating a load unit or subassembly from one station to another comprising
a pair of plastic unitary integrally molded end nest component members, each having laterally extending support ledges complementary to and with respective ends of said load unit or subassembly to support and cradle the same, said end nest members being arranged in parallel opposedly facing relationship,
a pair of plastic unitary integrally molded separator and tieing members removably secured to respective opposedly facing ends of said end nest members, and means removably securing said separator and tieing members to said end nest members,
said end nest component members comprising
a frame and a grid integrally formed thereon,
said support ledges extending laterally from said grid.

6. The cradle set defined in claim 5, wherein
said end nest members are each provided with end panels in said frame at their respective ends having bolt openings therethrough,
said separator and tieing members are each provided with end panels at their respective ends having bolt openings therethrough,
said securing means comprise bolt and nut fasteners.

7. The cradle set defined in claim 6, wherein
said frame comprises one or more stiffening ribs defining openings in said frame to reduce the weight of said end nest members.

8. The cradle set defined in claim 6, wherein
said separator and tieing members each comprises
a longitudinally extending body,
a stiffening rib extending laterally from one side of said body,
and end panels substantially normal to and at each end of said body.

9. A series of cradle sets arranged as a rack and adapted to be supported upon a lift platform for translating a plurality of load units or subassemblies from one station to another comprising
a first plastic unitary integrally molded end nest component member having laterally extending support ledges complementary to and with one end of said load unit or subassembly to support and cradle the same,
a second plastic unitary integrally molded end nest component member having laterally extending support ledges complementary to and with the other end of said load unit or subassembly to support and cradle the same,
and one or more plastic unitary integrally molded intermediate or center nest component members having on one side thereof laterally extending support ledges complementary to and with said other end of said load unit or subassembly, said one side oppposedly facing in the direction of said first end nest component member, and having on the other side thereof laterally extending support ledges complementary to and with said one end of said load unit or subassembly, said other side opposedly facing in the direction of said second end nest component member, to support and cradle adjacent ends of adjacent load units or subassemblies supported by said intermediate or center nest component member(s), plastic unitary integrally molded separator and tieing members removably secured to respective opposedly facing ends of said end and intermediate nest members, and means removably securing said separator and tieing members to said end and intermediate nest members.

10. The series of cradle sets defined in claim 9, wherein
said end nest members and separator and tieing members are made of a super tough plastic nylon resin or equivalent plastic material.

11. The series of cradle sets defined in claim 9, wherein
said end nest members and separator and tieing members are made of a thermoplastic polyamide or equivalent plastic material.

12. The series of cradle sets defined in claim 9, wherein
said end and intermediate nest members each comprises a frame and a grid integrally formed thereon,
said support ledges on each of said end nest members extending laterally from one side of said grid toward each other,
said support ledges on said intermediate or center nest member(s) extending laterally from each side of said grid toward an end nest member or an adjacent intermediate nest member.

13. The series of cradle sets defined in claim 12, wherein
said end and intermediate nest members are each provided with end panels in said frame at their respective ends having bolt openings therethrough,
said separator and tieing members are each provided with end panels at their respective ends having bolt openings therethrough,
said securing means comprise bolt and nut fasteners.

14. The series of cradle sets defined in claim 13, wherein
each said frame comprises one or more stiffening ribs defining openings in said frame to reduce the weight of said end and intermediate nest members.

15. The series of cradle sets defined in claim 13, wherein
said separator and tieing members each comprises
a longitudinally extending body,
a stiffening rib extending laterally from one side of said body,
and end panels substantially normal to and at each end of said body.

16. The series of cradle sets defined in claim 12, wherein
said grids of each end nest and intermediate nest members are each provided with a base adapted to rest upon said lift platform.

17. The series of cradle sets defined in claim 9, wherein
said end and intermediate nest members and separator and tieing members form a series of aligned connected rectangular cradle sets.

18. The series of cradle sets defined in claim 9, and including
a plastic unitary integrally molded accessory strap component for each said load unit or subassembly having a housing and a movable or rotatable element therein requiring securement during translation of said load unit,
said strap component comprising
means securing said movable or rotatable element to said housing against movement or rotation relative to said load unit,
and means complementary to the support ledges of at least one of said end nest members for seating said strap component on said latter support ledges of one end nest member.

19. Dual side-by-side series of cradle sets arranged as a rack and adapted to be supported on a lift platform for translating a plurality of load units or subassemblies from one station to another, each series comprising
a first plastic unitary integrally molded end nest component member having laterally extending support ledges complementary to and with one end of said load unit or subassembly to support and cradle the same,
a second plastic unitary integrally molded end nest component member having laterally extending support ledges complementary to and with the other end of said load unit or subassembly to support and cradle the same,
and one or more plastic unitary integrally molded intermediate or center nest component members having on one side thereof laterally extending support ledges complementary to and with said other end of said load unit or subassembly, said one side opposedly facing in the direction of said first end nest component member,
and having on the other side thereof laterally extending support ledges complementary to and with said one end of said load unit or subassembly, said other side opposedly facing in the direction of said second end nest component member, to support and cradle adjacent ends of adjacent load units or subassemblies supported by said intermediate or center nest component member(s), plastic unitary integrally molded separator and tieing members removably secured to respective opposedly facing ends of said end and intermediate nest members,
said separator and tieing members comprising a plurality of outer separator and tieing members connected to said end nest and intermediate nest component members at their respective outer distal ends and a plurality of intermediate or center separator and tieing members connected to adjacent side-by-side aligned end nest and intermediate nest component members at their respective inner proximal ends,
and means removably securing said separator and tieing members to said end and intermediate nest members.

20. The dual side-by-side series of cradle sets defined in claim 19, wherein
said end nest members and separator and tieing members are made of a super tough plastic nylon resin or equivalent plastic material.

21. The dual side-by-side series of cradle sets defined in claim 19, wherein
said end nest members and separator and tieing members are made of a thermoplastic polyamide or equivalent plastic material.

22. The dual side-by-side series of cradle sets defined in claim 19, wherein
said end and intermediate nest members each comprises a frame and a grid integrally formed thereon,
said support ledges on each of said end nest members extending laterally from one side of said grid in a direction toward the other,
said support ledges on said intermediate or center nest member(s) extending laterally from each side of said grid toward an end nest member or an adjacent intermediate nest member.

23. The dual side-by-side series of cradle sets defined in claim 22, wherein
said end and intermediate nest members are each provided with end panels in said frame at their respective ends having bolt openings therethrough,
said separator and tieing members are each provided with end panels at their respective ends having bolt openings therethrough,
said securing means comprise bolt and nut fasteners.

24. The dual side-by-side series of cradle sets defined in claim 23, wherein
each said frame comprises one or more stiffening ribs defining openings in said frame to reduce the weight of said end and intermediate nest members.

25. The dual side-by-side series of cradle sets defined in claim 22, wherein
said grids of each end nest and intermediate nest members are each provided with a base adapted to rest upon said lift platform.

26. The dual side-by-side series of cradle sets defined in claim 19, wherein
said end and intermediate nest members and separator and tieing members form a series of aligned connected rectangular cradle sets.

27. The dual side-by-side series of cradle sets defined in claim 19, wherein
said end and intermediate nest members are aligned in pairs on either side of and to said intermediate or center separator and tieing members,
said intermediate separator and tieing members each further comprising a longitudinally extending planar body,
a yoke at each end of said body,
and dual aligned end panels normal to and at each end of said planar body adjacent and connected to an end of said yoke.

28. The dual side-by-side series of cradle sets defined in claim 19, and including
a plastic unitary integrally molded accessory strap component for each said load unit or subassembly having a housing and a movable or rotatable element therein requiring securement during translation of said load unit,
said strap component comprising
means securing said movable or rotatable element to said housing against movement or rotation relative to said load unit,
and means complementary to the support ledges of at least one of said end nest members for seating said strap component on said latter support ledges of one end nest member.

29. A cradle set for translating a load unit or subassembly from one station to another comprising
a pair of plastic unitary integrally molded end nest component members, each having laterally extending support ledges complementary to and with respective ends of said load unit or subassembly to support and cradle the same, said end nest members being arranged in parallel opposedly facing relationship,
a pair of plastic unitary integrally molded separator and tieing members removably secured to respective opposedly facing ends of said end nest members,
fastener means removably securing said separator and tieing members to said end nest members,
a plastic unitary integrally molded accessory strap component for said load unit or subassembly having a housing and a movable or rotatable element therein requiring securement during translation of said load unit,
said strap component comprising
means securing said movable or rotatable element to said housing against movement or rotation relative to said load unit, and means complementary to the support ledges of at least one of said end nest members for seating said strap component on said latter support ledges of said one end nest member.

30. The cradle set defined in claim 29, wherein
said strap component is provided with vertically disposed ribs extending laterally outwardly from one side of said strap component,
one of said end nest members having vertical spaced apart guide ribs extending laterally outwardly to receive said strap component vertical ribs therebetween when said load unit is lowered into said cradle set.

31. A cradle set according to claims 18 or 28, wherein
each said strap component is provided with vertically disposed ribs extending laterally outwardly from one side of said component,
one of said end nest members and said intermediate nest members on one side thereof having vertical spaced apart guide ribs extending laterally outwardly to receive said strap component vertical ribs therebetween when each said load unit is lowered into its respective cradle set.

* * * * *